(12) United States Patent
Abdelnur et al.

(10) Patent No.: US 8,688,824 B2
(45) Date of Patent: Apr. 1, 2014

(54) MESSAGE-BASED COMMUNICATION SYSTEM MONITOR

(75) Inventors: Humbert Jorge Abdelnur, Nancy (FR); Radu State, Villers-les-Nancy (FR); Olivier Festor, Liverdun (FR)

(73) Assignee: Inria Institut National de Recherche en Informatique et en Automatique, Le Chesnay (FR)

( * ) Notice: Subject to any disclaimer, the term of this patent is extended or adjusted under 35 U.S.C. 154(b) by 620 days.

(21) Appl. No.: 12/808,094

(22) PCT Filed: Dec. 9, 2008

(86) PCT No.: PCT/FR2008/001712
§ 371 (c)(1),
(2), (4) Date: Sep. 8, 2010

(87) PCT Pub. No.: WO2009/103872
PCT Pub. Date: Aug. 27, 2009

(65) Prior Publication Data
US 2010/0332651 A1   Dec. 30, 2010

(30) Foreign Application Priority Data

Dec. 20, 2007   (FR) ..................... 07 08946

(51) Int. Cl.
*G06F 15/173* (2006.01)
*H04L 12/26* (2006.01)
*H04L 29/06* (2006.01)
*G06F 11/30* (2006.01)

(52) U.S. Cl.
CPC ........... *H04L 43/10* (2013.01); *H04L 29/06884* (2013.01); *G06F 11/30* (2013.01); *G06F 11/3072* (2013.01); *H04L 43/18* (2013.01)
USPC ...................................... 709/224

(58) Field of Classification Search
CPC .......... H04L 43/10; H04L 43/18; G06F 11/30
USPC ......................................... 709/224
See application file for complete search history.

(56) References Cited

U.S. PATENT DOCUMENTS 6,850,252 B1 * 2/2005 Hoffberg ...................... 715/716
7,486,673 B2 * 2/2009 Harijono et al. .............. 370/389

(Continued)

FOREIGN PATENT DOCUMENTS

EP   1 788 489 A1   5/2007
FR   2 842 970       1/2004

OTHER PUBLICATIONS

International Search Report, dated Jun. 25, 2009, corresponding to PCT/FR2008/001712.

(Continued)

*Primary Examiner* — Asghar Bilgrami
(74) *Attorney, Agent, or Firm* — Christie, Parker & Hale, LLP (57) ABSTRACT

Message-based communication system monitor, comprising an inspector (16) capable of inspecting a message so as to determine whether it satisfies a specific pattern of a source, characterized in that it comprises an analyser (12) capable of inspecting a communication stream, so as to derive therefrom a structured representation of messages, in correspondence with a plurality of rules, and in that the inspector (16) is devised so as to: *apply a stored pattern to a structured representation of the inspected message, so as to establish a signature, and *compare the signature with reference data, so as to classify the inspected message in the case of correspondence.

13 Claims, 6 Drawing Sheets

(56) References Cited

U.S. PATENT DOCUMENTS

| | | | |
|---|---|---|---|
| 8,042,182 B2* | 10/2011 | Milani Comparetti et al. | 726/23 |
| 2004/0083299 A1* | 4/2004 | Dietz et al. | 709/230 |
| 2007/0150574 A1* | 6/2007 | Mallal et al. | 709/223 |
| 2010/0095367 A1* | 4/2010 | Narayanaswamy | 726/12 |

OTHER PUBLICATIONS

Moore, et al., "Toward the Accurate Identification of Network Applications," [Online] 2005, XP-002495432, pp. 41-54.

* cited by examiner

MESSAGE-BASED COMMUNICATION SYSTEM MONITOR

CROSS-REFERENCE TO RELATED APPLICATION

This application is a National Phase Patent Application and claims the priority of International Application Number PCT/FR2008/001712, filed on Dec. 9, 2008, which claims priority of French Patent Application Number 0708946, filed on Dec. 20, 2007.

The invention relates to the field of message-based communications.

More particularly, the invention relates to the processing of messages within a communications network, for determining information characteristic of these messages for classification or other purposes.

It is known in data or telecommunications networks to analyse messages and process their contents in order to route them or apply rules to them. This is done by consulting message fields which are already known.

This type of solution requires a thorough knowledge of the communications protocol. By its nature this is highly time-consuming and has a fairly limited ability to evolve.

Moreover, the adaptation of these solutions is also limited, as each new protocol requires a new manual study and the process is not automated. Finally, the more complex the protocols, the more complicated the task.

None of the existing solutions has thus proved satisfactory.

The invention sets out to improve the situation.

To this end, the invention proposes a message-based communication system monitor comprising an inspector capable of inspecting a message in order to determine whether it satisfies a specific pattern of a source.

This monitor comprises an analyser capable of inspecting a communication stream so as to derive from it a structured representation of messages, in correspondence with a set of rules.

The inspector is designed to:
apply a stored pattern to a structured representation of the message inspected, to establish a signature, and
compare the signature with reference data, in order to classify the inspected message in the event of correspondence.

The invention also relates to a message-based communication system monitor which comprises:
an analyser capable of inspecting a communication stream so as to derive from it a structured representation of messages, in correspondence with a set of rules,
a discriminator capable of comparing structured representations relating to a number of message sources, so as to derive from them selective patterns of respective sources.

The invention also relates to a method of analysis of message-based communication, comprising:
a) establishing selective patterns from distinct sources,
b) analysing a new message in order to associate it with one of the distinct sources.

Step a. comprises:
a1) inspecting a plurality of messages in order to derive from them structured representations in correspondence with a set of rules,
a2) searching for selective source patterns, from a comparison of structured representations relating to a number of sources.

Step b) comprises:
b1) associating the new message with one of the sources by comparing the selective patterns with a signature derived from the structured representation associated with this new message.

These monitors and this process are particularly useful because they permit automated processing of the identification of the messages, irrespective of the complexity of the protocol, without the need to have any more advanced knowledge than their grammar.

Further features and advantages of the invention will become more apparent from a study of the description that follows, which is provided as an illustration without being restrictive, and drawn from examples shown in the drawings, wherein.

The drawings and description that follow essentially contain elements of a certain nature. They may serve not only to assist with the understanding of the present invention but may also contribute to its definition, in certain circumstances.

The present description is of a kind that involves elements eligible for protection under copyright laws. The proprietor of the rights has no objection to the identical reproduction of the present patent specification or its description by any third party, as it appears in official files. Otherwise, they reserve their rights in full.

Figure 1:
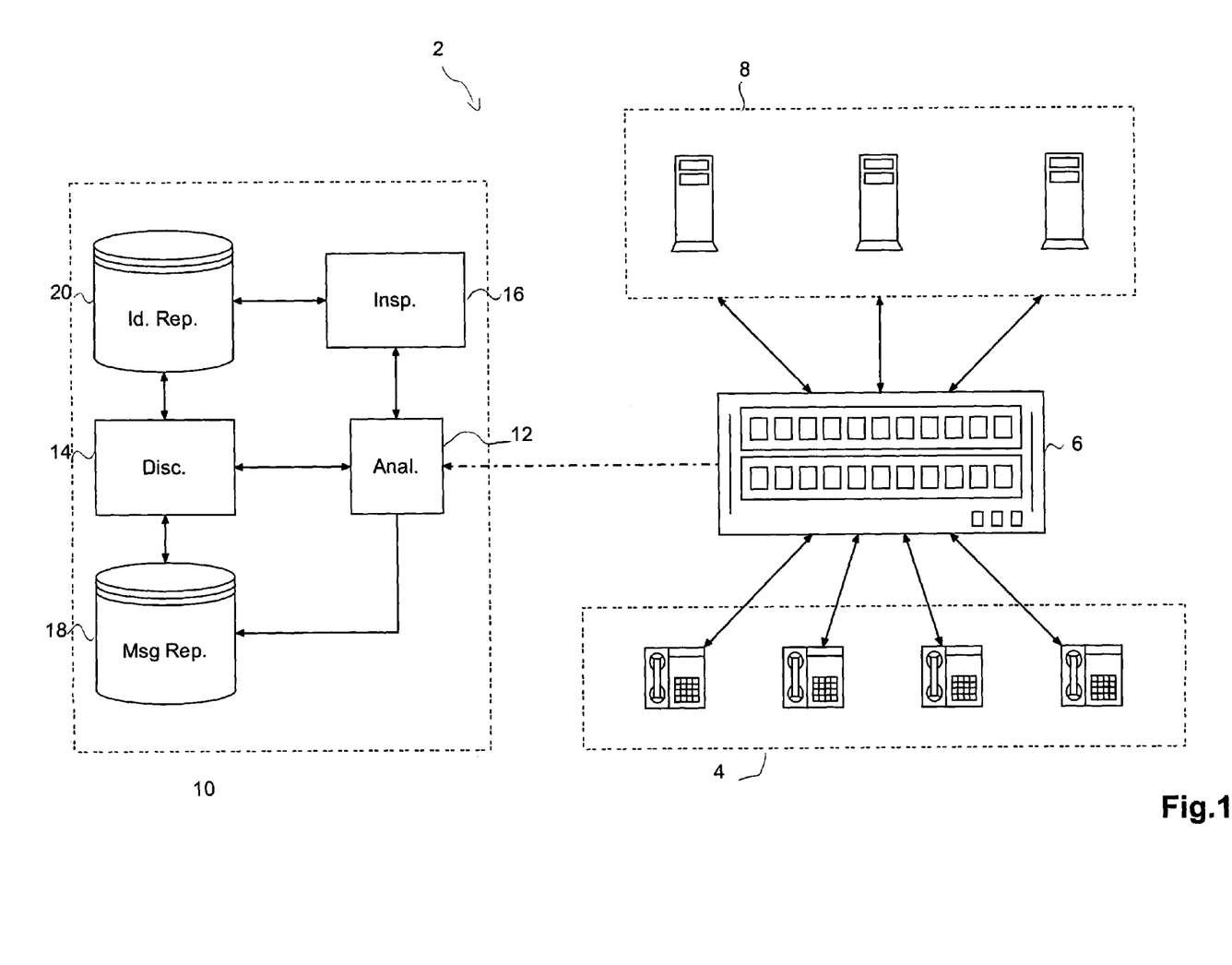
FIG. 1 shows an example of a communications system comprising a monitor according to the invention.

FIG. 1 shows a communications system 2 in which a set of telephones 4 communicate through a router 6 (or hub) with servers 8 that manage all the telephone communications between themselves and with the outside. The system 2 also comprises a communications monitor 10 which analyses and classifies the messages exchanged within the system.

The monitor 10 comprises an analyser 12, a discriminator 14, an inspector 16, a message representation storage memory 18 and a pattern storage memory 20. The memories 18 and 20 may hereinafter be referred to as "stores".

The monitor 10 may be used in different ways in the communications system 2. Thus, it may be introduced into the router 6, where it can operate by intercepting, processing and forwarding messages received by the router 6, or by copying these messages. The monitor 10 may also be introduced into the servers 8 and be used for managing communications.

The telephones 4 communicate by means of a given communications protocol. This protocol may be for example the SIP protocol, although other protocols may also be envisaged.

The analyser 12 has the function of extracting from each message processed by the monitor 10 a structured tree representation which is based on the syntax of the communications protocol used for formatting these messages.

The structured representations are stored in the store 18 for access by the discriminator 14, in order to establish signatures or impressions recorded in the store 20.

The discriminator 14 works by analysing the different ways in which the different telephones implement the communications protocol.

More precisely, the protocol used for the communications is ambiguous, in the sense that it implements syntax rules which may be interpreted in a number of ways for editing the messages.

Thus, two telephone manufacturers will programme different firmwares for implementing this protocol. This can be ascertained from the different editing that will be applied to messages containing identical information from a semantic point of view.

The discriminator therefore determines signatures or impressions characteristics of each distinct message sender (or source), on the basis of the analysis of the tree representations that are stored in the store 18.

The combination of analyser 12, discriminator 14, stores 18 and 20, thus forms part of the monitor 10 which is used in a phase which will be referred to hereinafter as "training", for establishing characteristic signatures.

The training phase will be explained later on with reference to FIGS. 3 to 8.

The inspector 16 operates by comparing a structured tree representation of a given message with the signatures from the store 20. After this comparison, the inspector 16 sends an identifier of a source. This source is deemed to have sent the message being inspected.

The combination of analyser 12, inspector 16 and store 20 thus forms part of the monitor 10 that is used in a phase which will be referred to hereinafter as "execution", to classify messages observed by the monitor 10 in the communications system 2.

The execution phase will be explained later on with reference to FIGS. 9 and 10.

In the example described above, the monitor 10 thus makes it possible to carry out a rapid audit of an installed "fleet" of telephones, by first of all establishing the signatures of each type of telephone supposed to be present in the fleet, and by analysing the signatures of each of them in conjunction with their physical address.

However, numerous other applications are possible depending on the location where the monitor 10 is integrated, as will become apparent hereinafter.

Figure 2:
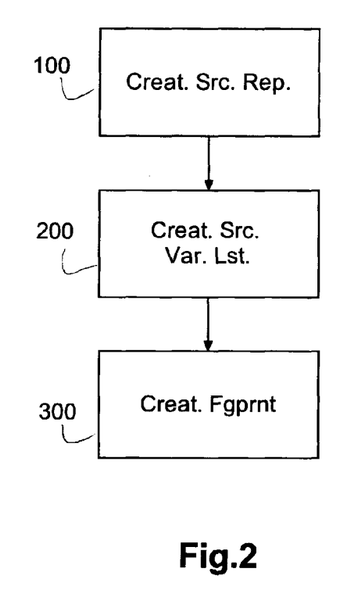
FIG. 2 shows a process carried out by the monitor in FIG. 1.

FIG. 2 shows a process carried out by the analyser 12 and the discriminator 14 in the training phase.

The training phase comprises three main steps.

In a first step 100, the analyser 12 processes a number of messages which will hereinafter be referred to as the "training set", and stores the corresponding tree representations in the store 18.

The messages in the training set are associated with the sources that have sent them, i.e. the hardware to which they correspond is known from the outset. The training set may be established by automatically generating messages in accordance with the communications protocol envisaged.

In a step 200, the discriminator 14 processes the tree representations derived from messages obtained from the same source, and generates a list of elements that vary between these messages. This operation is carried out for each of the distinct message sources.

Finally, in a step 300, the discriminator 14 compares, for each possible pair of sources that are different from one another, all the messages from these sources between themselves. This comparison is used to establish, with the aid of the list of elements that vary from each source, a signature or imprint for each source.

This signature is stored in the store 20 and corresponds to a list of pathways of matching tree representations for each distinct source of a characteristic signature value.

Alternatively, the training set is established in repetitive manner, by repeatedly adding messages and carrying out the training steps with the set thus formed.

A stability index is calculated after each repeat of the training. This index indicates whether the training set contains enough messages to establish sufficiently distinctive signatures, or whether new messages are needed.

This alternative embodiment is advantageous because it makes it possible to use a restricted training set, which is important in performance terms. In fact, most protocols are extremely complex and an exhaustive training set would be particularly onerous to generate and process.

Figure 3:
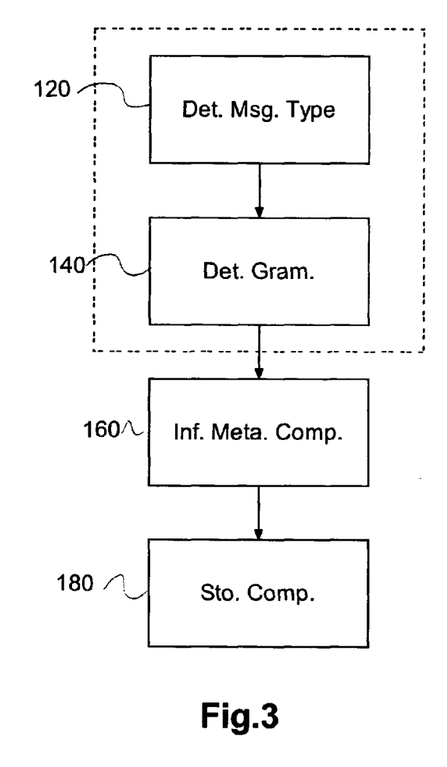
FIG. 3 shows a particular embodiment of a first step in FIG. 2.

FIG. 3 shows a particular embodiment of step 100.

For a given message, its corresponding tree representation can be created by the analyser in the following manner:

in a step 120, the analyser determines the type of message received at the input;

in a step 140, and on the basis of the type determined in step 120, the analyser 12 determines the protocol used by the message, as well as the syntax rules associated with this protocol;

in a step 160, the analyser 12 uses the rules obtained in step 140 to carry out a lexical analysis of the message and establish a corresponding structured tree representation; and in a step 180, the analyser 12 stores the tree representation of the message of step 160 in the store 18, in correspondence with an identifier of the source sending the message.

These types of operation may be carried out by numerous existing parsers, for example of the LR or LL type, depending on the syntax rules of the protocol in question.

There are cases where certain syntaxes may be ambiguous from the semantic point of view for the parsers, i.e. a parser is unable to determine which syntax rule to use.

To prevent such situations, a GLR-type parser is preferable to other types of parsers. Certain modifications may be necessary to allow the rules associated with each protocol to be taken into account. A parser of this kind may advantageously be coded in Python language.

Steps 120 and 140, for determining the syntax rules, may be omitted, notably when it is known from the outset which protocol is used.

Table 1 that follows shows a set of syntax rules which may characterise a protocol by way of example.

TABLE 1

| Element | Syntax | Comment |
|---|---|---|
| Message | ("Query" / "Reply") 1*SP Method | |
| Header | Header 1*SP 1*("("Opt-Value")") | |
| Opt-Value | (Ack / Value / Version) | |
| Method | 1*ALPHA | |
| Ack | "Ack" HCOLON 1*DIGIT | |
| Value | "Value" HCOLON 1*ALPHA | |
| Version | "Version" 1*SP DIGIT "." DIGIT | |
| ALPHA | %x41-5A / %x61-7A | A-Z/a-z |
| DIGIT | %x30-39 | 0-9 |
| HCOLON | *SP ":" *SP | |
| SP | %x20 | space |

Figure 4:
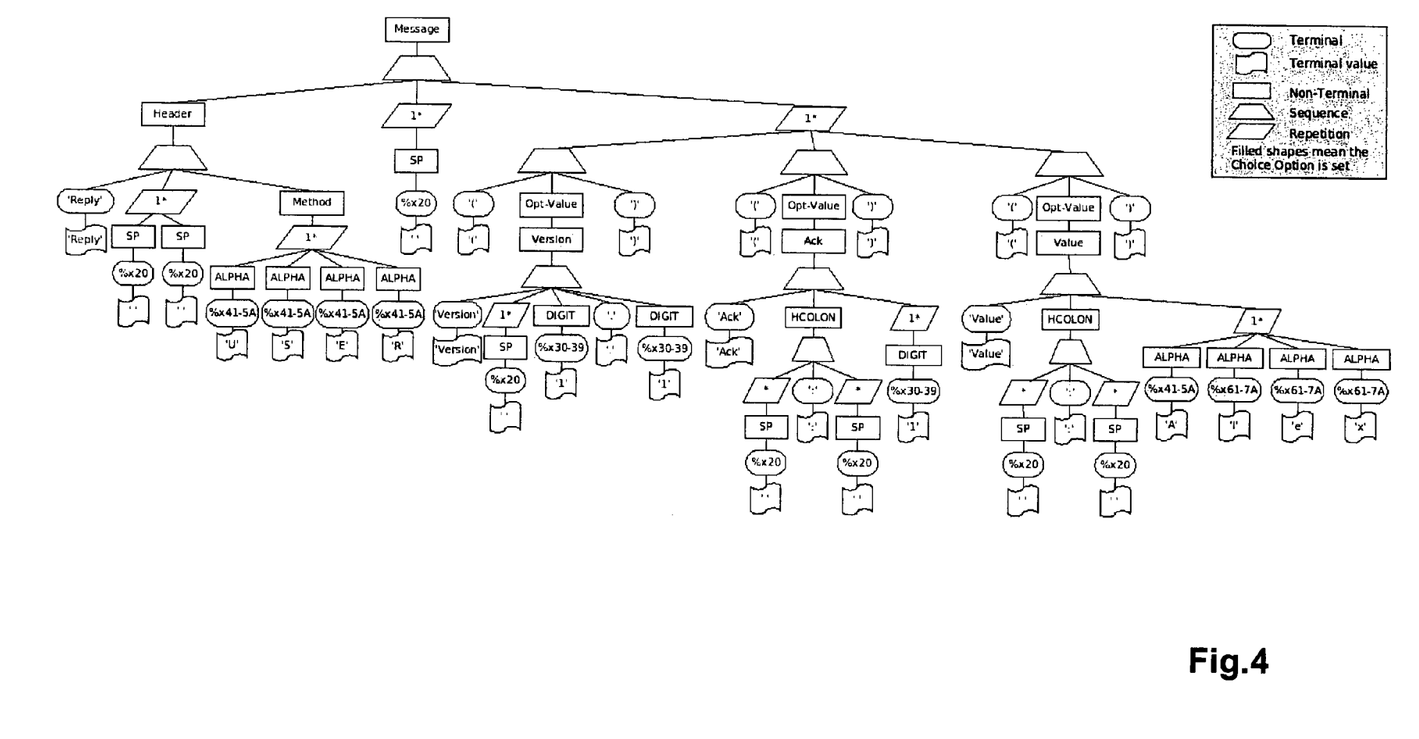
FIG. 4 shows a structured tree representation obtained by applying the step in FIG. 3 to a message by way of example.

FIG. 4 shows a tree structure obtained as a result of the processing of the message by way of example shown below by the analyser 12 using the rules in Table 1.

Message by way of example: Reply USER (Version 1.1) (Ack:1)(Value:Alex)

In this tree representation, the message has been broken up into syntactical elements in accordance with the syntax rules of the protocol in Table 1.

Then, each element has been placed in a Table according to an n-ary tree which obeys the following structural rules:
- a terminal is a node which has an associated name marker and which is a leaf. In other words, the value of this node is the end of the branch, and this node has no children.
- a sequence is a node which has an associated name marker and which has a fixed number of child nodes. This fixed number is associated with the marker of this node in the syntax rules of the protocol.
- a repeat is a node which has an associated name marker and which has a set of child nodes which may vary, which are delimited in the message by lexical limits imposed by the rules of the protocol. The order in which these child nodes are listed may be characteristic of the source.
- a non-terminal is a node which has an associated name marker and which has a single child which may be of any of the types, i.e. a terminal, a sequence, a repeat or a non-terminal.
- a choice defines a choice between several possible predefined values and is marked by an indicator. The role of this category of node will become more apparent hereinafter.

This tree representation may be saved for example in the form of an XML file, which will allow a rapid and effective comparison to be made at a later stage between different tree representations.

Figure 5:
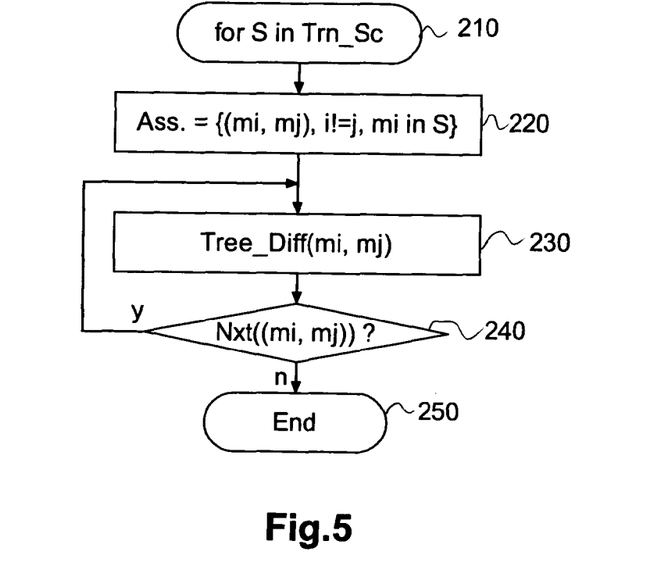
FIG. 5 shows a particular embodiment of a second step in FIG. 2.

FIG. 5 shows a particular embodiment of step 200 in FIG. 2.

This embodiment comprises a step 210 in which a source S is selected from among the distinct sources of the training set.

Step 210 in fact represents a loop, i.e. the following steps are repeated for each of the sources in the training set.

For this, it is possible to envisage a sequential process, i.e. with each source being processed one after the other, or, equally, a parallel process, i.e. where several sources are processed simultaneously by separate material resources.

For a source S chosen in step 210, the discriminator 14 selects all the structured tree representations in the store 18 which are associated with the source S.

On the basis of these representations, the discriminator 14 generates a set of pairs as in a step 220. These pairs each contain two distinct identifiers of tree representations and they are drawn up so that all the pairs of messages coming from the source S that can be achieved are represented in the ass set.

It will be noted that, in the foregoing and hereinafter, sometimes reference is made to tree representations and messages without distinguishing between them, in so far as a tree representation corresponds to a given message and vice versa.

Then a loop is used, in which a Tree_Diff( ) function is executed in a step 230 with each pair of representations (mi; mj) of the assset.

The Tree_Diff( ) function has the result of determining a list of variations between the messages that it receives for argument. It is not necessary to submit the messages or the associated tree representations directly for argument. It is sufficient to provide a reference, such as an identifier or a pointer towards a particular node.

Figure 6:
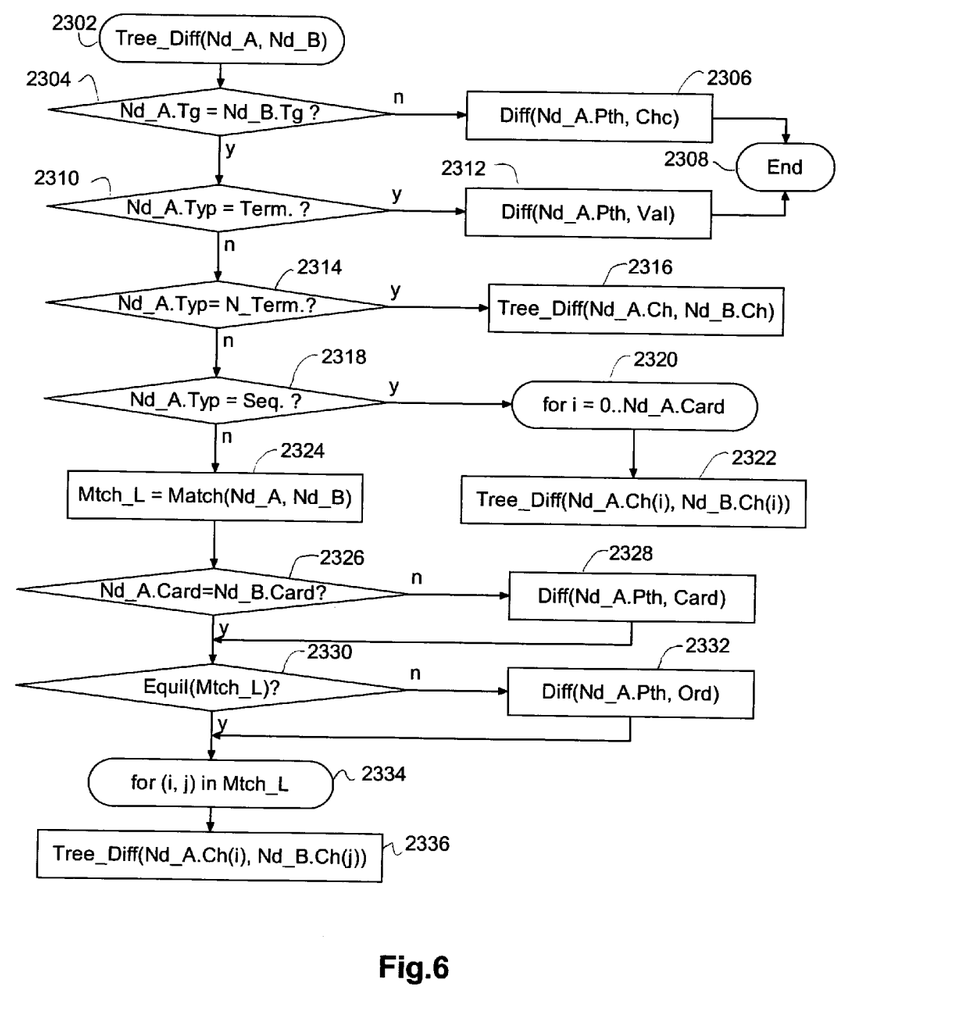
FIG. 6 shows a particular embodiment of a function in FIG. 5.

More precisely, as will become apparent from FIG. 6, the Tree_Diff( ) function described here receives as arguments pointers towards the main nodes of each of the tree representations of each pair.

The loop is repeated as long as there is a stop condition 240 relating to the fact that a pair of messages to be compared still remains, or does not remain, in the assset. When this is the case, the loop terminates at 250.

FIG. 6 shows an exemplifying embodiment of the Tree_Diff( ) function in step 230.

In the example described here, the Tree_Diff( ) function benefits from the tree-like nature of the structured representations to take on a recursive shape, which is particularly suitable for this type of problem. It would also be possible to implement this function in an iterative or other manner.

As will become apparent hereinafter, the Tree_Diff( ) function uses the fact that each of the nodes can only be of four distinct types: terminal, sequence, repeat or non-terminal. On this basis, it processes the nodes by defining, on each occasion, differences which are characteristic of each type of node.

Because the Tree_Diff( ) function is recursive, FIG. 6 shows the recursion steps starting from a given pair of nodes Nd_A and Nd_B (operation 2302).

As shown hereinbefore, the Tree_Diff( ) function is called up with the two main nodes of the tree representations which are to be compared, and the representations are explored using the recursive calls included.

A recursion therefore starts at 2302 from a pair of nodes Nd_A and Nd_B. The recursion starts at 2304 with a test that compares the markers of the nodes Nd_A and Nd_B.

If these markers are distinct, this means that one is dealing with two totally distinct branches. From then on, a Diff( ) function is called up at 2306 with a pointer towards Nd_A and a string of characters "Chc" as arguments.

Then the recursion terminates at 2308, as there is no longer any point in comparing the sub-branches of nodes Nd_A and Nd_B.

The Diff( ) function is a function that receives a pointer and a string of characters as arguments.

The pointer corresponds to the pathway to follow in a tree representation to reach the nodes where the difference has been detected, and this pointer may be regarded as a "partial pathway". A partial pathway is therefore a pathway in the tree, which leads from the main node to a chosen node.

The character string is used to indicate to the Diff( ) function the nature of the difference that has been identified, and how to store this difference in the list of variations.

When the value of the string is "Chc", this means that the difference relates to the marker associated with each of these nodes. In this case, the Diff( ) function stores the partial pathway of the nodes and associates with them the value of the two markers.

When the value of the string is "Val", this means that the nodes Nd_A and Nd_B are terminal nodes and that the Diff( ) function has to compare the value associated with these nodes. If they have different values, the partial pathway is stored, in association with the two distinct values.

When the value of the string is "Card", this means that the nodes Nd_A and Nd_B are nodes of the repeat type, and that these repeats comprise a distinct number of elements. As a result, the function Diff( ) stores the partial pathway of these messages, in association with these two distinct lengths.

Finally, when the value of the string is "Ord", this means that the nodes Nd_A and Nd_B are nodes of the repeat type, and that these repeats comprise elements that are placed in a different order. As a result, the function Diff( ) stores the partial pathway of these messages, in association with a signature characteristic of the order, which will be explained below.

To store all these differences, the Diff( ) function may proceed in various ways.

One particularly effective method is to use a list in which are stored triplets formed each time:
  from a partial pathway which corresponds to a partial pathway for which a difference has been found between two messages,
  the type of difference detected, and
  a list of values associated with this partial pathway, which contains all the values that make up this difference as defined hereinbefore.

This list will hereinafter be referred to as List_Var and can be stored in either of the stores 18 and 20.

It should be understood that the intention is to record all the differences that exist between the messages, in order to make better use of the constant elements in a subsequent step.

When the Diff( ) function seeks to enter a new difference in the list List_Var, it may be that this difference is already present.

The Diff( ) function may be programmed to detect this type of occurrence (for example using an ordered list) and consequently only enter a difference when it is new.

Alternatively, the Diff( ) function may be programmed to progress rapidly, storing all the differences, whether or not they are already present.

Moreover, the Diff( ) function may be programmed to store, in the list List_Var, an indicator of the source for which each difference has been identified.

Alternatively, this indicator may be replaced by the use of a number of lists of values in an implicit order for each partial pathway, a special character (such as '0') indicating when a source does not have a given difference.

In the event that the nodes Nd_A and Nd_B have identical markers, the recursion takes place in an operation 2310 in which it is determined whether the nodes Nd_A and Nd_B are terminal nodes.

If this is the case, the Diff( ) function is called up in an operation 2312 with the string of characters "Val" to manage the case where the value associated with the nodes is distinct, then the recursion terminates at 2308.

When the nodes Nd_A and Nd_B are not terminal nodes, the recursion takes place in an operation 2314 in which it is determined whether the nodes Nd_A and Nd_B are sequence nodes.

If this is the case, a series of new recursions of the Tree_Diff( ) function is launched by a loop 2320, on the child nodes of the nodes Nd_A and Nd_B (operation 2322). As many new recursions are launched as there are elements in the sequence.

If the nodes Nd_A and Nd_B are not any of the previous types, they are repeat nodes. The recursion therefore establishes, in an operation 2324, a list Mtch_L which comprises a list of permutations of the elements of the repeats of Nd_A and Nd_B.

The list Mtch_L is established by means of a function Match( ) which analyses the elements of the repeat of Nd_A on the one hand and Nd_B on the other hand, and associates these elements in pairs when they correspond.

To determine that two elements correspond, the function Match( ) analyses the contents thereof. This analysis is based on a sub-set selected from the tree associated with these elements.

More precisely, the function Match( ) carries out the following operations on each element:
  determining the partial sub-pathways that correspond to choices;
  determining the partial sub-pathways that correspond to elements peculiar to the element in question, i.e. not imposed by the syntax of the protocol.

By "sub-pathway" is meant the part of a partial pathway located after the node corresponding to the element processed by the Match( ) function. The whole of the first element and that of the second element are then compared to define their intersection and joining. The ratio between the cardinality of the intersection and the cardinality of the joining defines the degree of similarity of these elements.

Two elements are deemed to correspond when their degree of similarity is above a selected threshold. Two corresponding elements are stored in the form of a pair of indices indicating their respective positions in the intersection defined above. This position may be obtained by calculating the degree of similarity between the elements of the repeat Nd_A (or Nd_B, respectively), on the one hand, and the elements of the intersection, on the other hand.

Then, the cardinality of the repeats Nd_A and Nd_B is tested in an operation 2326. If these two repeats have a distinct number of elements, the Diff( ) function is called up at 2328 with the "Card" string to store this difference.

Then, (or when the repeats Nd_A and Nd_B have the same cardinality), a function Equil( ) is called up in an operation 2330 to determine whether the repeats Nd_A and Nd_B have corresponding elements that are permutated. This may be done for example by analysing whether the list Mtch_Lst contains a pair whose indices are distinct.

If this is the case, the Diff( ) function is called up in an operation 2332 with the character string "Ord" and this function establishes a signature of the nodes Nd_A and Nd_B in order to store a difference reflecting this permutation.

The signature of the nodes is established as follows:
  the intersection of the sets of partial sub-pathways described above is stored as a reference set associated with this sub-pathway;
  each pair in the list Mtch_L is compared with the elements of the reference set by calculating the degree of similarity, and two lists (one for Nd_A and one for Nd_B) are drawn up which contain the indices of the elements of Mtch_L graded in the reference set.

Then, (or when the repeats Nd_A and Nd_B do not have any permutations), the recursion continues by a loop 2334, which launches a series of new recursions of the Tree_Diff( ) function on the nodes designated by the pairs in the list Mtch_Lst.

If the list Mtch_Lst does not contain any pair (i.e. no element of the repeats of Nd_A and Nd_B can be associated) the recursion is terminated.

As can be seen from the foregoing, the tree representations are run through recursively, each time with the highest difference in level being stored, where applicable.

Once all the messages in the training set have been compared for each of the sources, the list Lst_Var is complete and available for generating an imprint in step 300.

Figure 7:
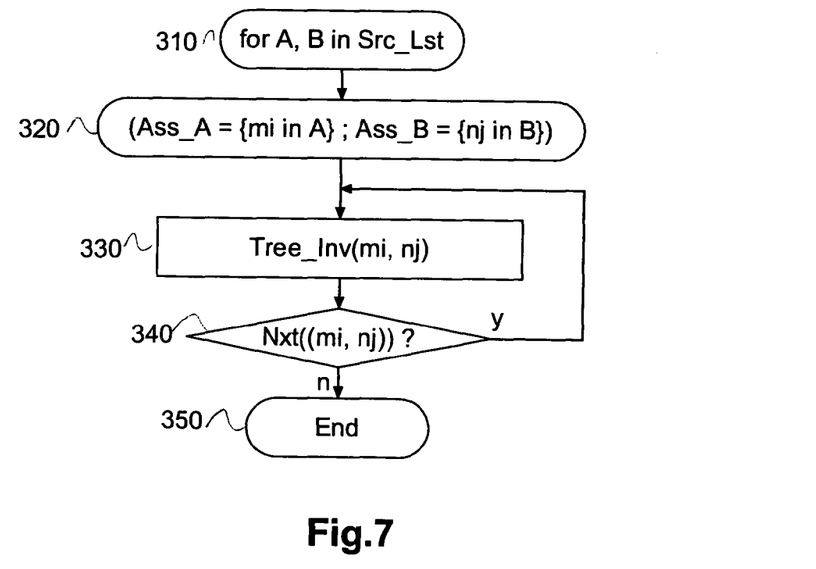
FIG. 7 shows a particular embodiment of a third step in FIG. 2.

FIG. 7 shows a particular embodiment of step 300. This embodiment is similar to the embodiment of step 200 in FIG. 5.

Thus, a loop is launched at 310, which establishes all the possible pairs of sources and carries out the following steps with all these pairs.

For each pair of sources, the set of structured representations of sources A and B are collected in respective sets Ass(A) and Ass(B) in a step 320.

Then a loop is utilised in which a Tree_Inv( ) function is executed in a step 330 with each pair of representations (mi; nj) of the sets Ass(A) and Ass(B).

Thus the messages of A and the messages of B are all compared with one another, and the Tree_Inv( ) function draws up a list Lst_Inv which contains a pattern of invariants accompanied by values that represent signatures for each source.

Figure 8:
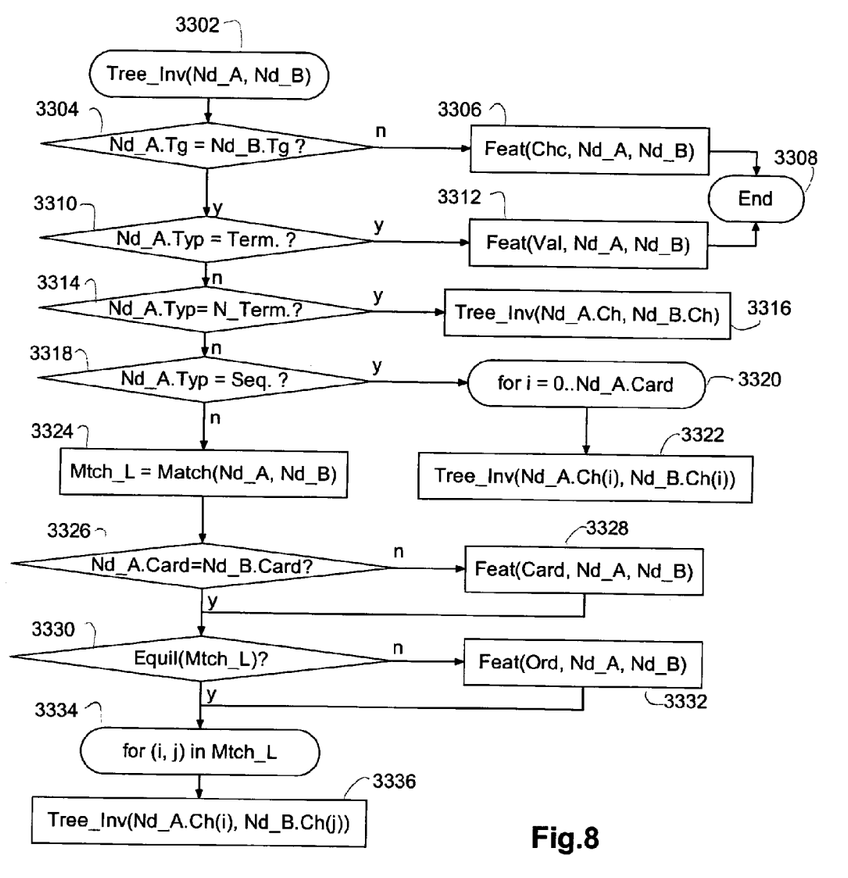
FIG. 8 shows a particular embodiment of a function in FIG. 7.

The nature of this list and its production will become clearer from the description of FIG. 8.

The loop is repeated as long as there is a stop condition 340 relating to the fact that a pair of messages to be compared still remains, or does not remain, in the Ass(A) and Ass(B) sets. When this is the case, the loop terminates at 350.

A particular embodiment of the Tree_Inv( ) function will now be described with reference to FIG. 8.

The Tree_Inv( ) function and the Tree_Diff( ) function are used in totally parallel fashion. In fact, these functions are identical in the tests that they carry out and in the recursions that they generate. In fact, the only difference is that the Tree_Inv( ) function calls up a Feat( ) function where the Tree_Diff( ) function calls up the Diff( ) function.

Consequently, the steps of the Tree_Inv( ) function will not be described in any further detail here and only the differences between the Diff( ) and Feat( ) functions will be explained. As a result the description of the operations in FIG. 8 referenced 33xy should be regarded as similar to the description of the operations in FIG. 6 referenced 23xy.

The function Feat( ) differs from the function Diff( ) in that it stores the differences in static fields between the messages from the different sources, as opposed to differences of a dynamic nature in the case of the function Diff( ).

In effect, a difference identified in a recursion of the function Tree_Inv( ) is only stored in the list Lst_Inv if this difference is not contained in the list Lst_Var.

Moreover, the function Feat( ) receives the identifiers of the sources emitting these messages to store them in correspondence with the difference values that are stored.

The stored differences, by contrast, are identical in their establishment, whether the difference is of the "Chc", "Val", "Card" or "Ord" type. The description of the establishment of these differences thus applies in identical manner.

The successive comparisons of steps 200 and 300 may be seen as follows:
  the comparisons in step 200 determine the differences between the messages coming from the same sources. The message fields compared are of a static or dynamic nature. As the messages come from the same sources, the differences which are thus isolated are of a dynamic nature;
  the comparisons in step 300 determine the differences between the messages coming from distinct sources. The differences obtained therefore characterise fields which are both static and dynamic. However, as in the function Feat( ) the differences identified in step 200 (dynamic) are not retained, only the differences of a static nature are retained, which therefore characterise each source well.

It should also be noted that, as these comparisons are based on retaining the differences, the message fields of a static nature that are processed identically by all the sources are naturally eliminated from the selection as they do not constitute differences.

Moreover, this also means that there is no need to retain, as a difference, a field which is static for one source and dynamic for another, thereby limiting classification errors.

These comparisons are therefore based on the syntax of the messages and not on their vocabulary. This constitutes a considerable advantage achieved by means of the invention.

Moreover, the variety of the differences identified by the invention offers an analysis which then allows the message to be analysed semantically.

At the end, the list Lst_Inv is therefore relatively similar to the list Lst_Var, except that it contains partial pathways which characterise the sources, and lists of values for this difference for each source. The sources are identified each time, either by an identifier or by an implicit order.

The skilled man will be able to adapt the alternative embodiments presented with the list Lst_Var to the list Lst_Inv, as well as for the functions associated with them.

It would also be possible, as an alternative, to modify the function Diff( ) and the list Lst_Var and to store only the partial pathways of the differences and the types of difference.

In this case, the lists Lst_Var and Lst_Inv become slightly more different, as the list Lst_Inv always stores the values of the differences associated with each source.

The list Lst_Inv may furthermore be stored in the store 20 or in another store, for later classification of messages from the communications system 2.

Figure 9:
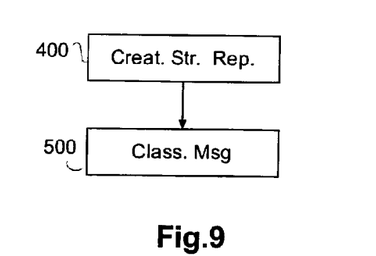
FIG. 9 shows another process carried out by the monitor in FIG. 1.

FIG. 9 shows a process carried out by the analyser 12 and the inspector 16 in the execution phase.

This process comprises two main steps:
  a step 400 in which the analyser establishes the structured tree representation of a new message;
  a step 500 in which the inspector applies the list Lst_Inv to the representation drawn up in step 400 to classify the new message as having been sent by an identified source.

Figure 10:
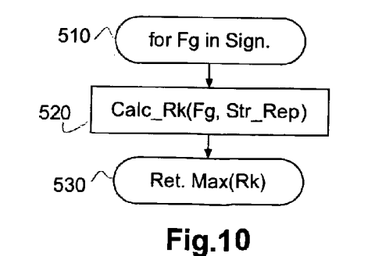
FIG. 10 shows an embodiment of a step in FIG. 9.

FIG. 10 shows a particular embodiment of the step 500.

The step 500 starts with a loop 510 which repeatedly applies a step 520 for each of the sources having a signature in the list Lst_inv.

The step 520 applies a function Calc_Rk( ) which takes as arguments a signature from the list Lst_Inv and the structured representation of the message being inspected, and writes a correspondence value in a table Rk[ ].

This makes it possible to carry out a method of classification by means of the closest neighbours.

Finally, in a step 530, the identifier of the source that has the highest rank in the table Rk[ ] is sent back.

Another application for the identification of sources of messages is in software firewalls or the like.

In fact it is common knowledge that certain firmware has flaws while other firmware does not. It may therefore be useful to block messages when they correspond to known flaws in known firmware.

In general, the invention allows identification to be made which makes it possible to refine the processing of messages in order to route them, as a function of the sender or intended recipient of the message.

Another application is software signature. Some software can be used to generate the programme code which is used for sending communications in accordance with a protocol.

The analysis of such messages therefore allows one to determine whether a programme code generating software of this kind has been used for sending these messages.

From the hardware point of view, the invention has been presented by reference to distinct stores. This distinction has been portrayed for explanatory purposes. These stores may be located on the same logical or physical volume, which may be of any type known for data storage.

Similarly, the elements shown may be grouped or, on the contrary, distributed, in hardware terms, as within the scope of an application to telecommunications, or in software terms, as a function of the abstraction layer to which the invention is attached or within the scope of its application to software communications systems.

Moreover, in the foregoing description, it should be noted that all the variants may be combined with one another, subject to their being compatible. Although preferred embodiments have been described, it goes without saying that the invention encompasses all these variants and combinations thereof.

One particular example relates to the monitor. Although it is shown here as being unitary, in terms of the driving an execution phase, it is clear that it could be made up of two separate elements, one for driving and one for classification.

The invention also covers, as products, the software elements described which are made available in any computer-readable "medium" (support). The expression "computer-readable medium" includes magnetic, optical and/or electronic data storage supports, as well as a transmission support or carrier, such as an analogue or digital signal.

Supports of this kind include both the software elements themselves, i.e. the elements suitable for being executed directly, and the software elements used for installation and/or running, such as an installation disc or a downloadable installation programme. Such installation may be carried out globally, across client terminals and server stations, or separately, with appropriate products on each occasion.

The invention claimed is:

1. A message-based communications system monitor, comprising: an inspector capable of inspecting a message; and an analyzer capable of inspecting a communication stream so as to derive a structured representation of messages, in correspondence with a set of rules, wherein the inspector is configured to: identify an emitting source of the inspected message by comparing a signature derived from the inspected message structure representation to patterns associated respectively to sources, wherein a pattern associated respectively to a source characterizes a selective implementation of a communication protocol by said source; and a discriminator capable of comparing sets of structured representations of messages coming from different sources, and eliminating differences shared with sets of dynamic differences associated with said different sources to establish a set of static differences forming selective patterns.

2. A message-based communications system monitor, comprising: an analyzer capable of inspecting a communication stream to derive a structured representation of messages, in correspondence with a set of rules; and a discriminator capable of comparing sets of structured representations relating to a plurality of message sources coming from different sources to derive selective patterns of respective sources and eliminating differences shared with sets of dynamic differences associated with said different sources to establish a set of static differences forming selective patterns, wherein a pattern associated respectively to a source characterizes a selective implementation of a communication protocol by said source.

3. A monitor according to claim 2, wherein the discriminator comprises: a comparator capable of using a set of structured representations of messages coming from a same source, and determining the set of dynamic differences associated to said source by making comparisons between the structured representations of messages; and a deductor capable of comparing sets of structured representations of messages coming from different sources, and eliminating the differences shared with the sets of dynamic differences associated with said different sources determined by the comparator to establish said set of static differences forming selective patterns.

4. The monitor according to claim 2, wherein a selective pattern of respective sources comprises a set of values characteristic of a distinct source.

5. The monitor according to claim 2, wherein a selective pattern of respective sources comprises a set of pathways in the structured representation.

6. The monitor according to claim 2, wherein the structured representation of a message is an n-ary tree.

7. The monitor according to claim 6, wherein the nodes of the n-ary tree are produced as a function of the set of rules.

8. The monitor according to claim 7, wherein at least some of the rules are based on syntax of the messages of a communications protocol used by the messages.

9. The monitor according to claim 8, wherein at least some of the rules are based on semantics of the communications protocol used by the messages.

10. A computer implemented method for analyzing message-based communications, comprising: electronically establishing selective patterns from a plurality of distinct sources, electronically analyzing a new message to associate said message with one of the plurality of distinct sources, wherein said electronically establishing comprises: electronically inspecting a plurality of messages in order to derive from them structured representations in correspondence with a set of rules, and electronically searching for selective source patterns, from the comparison of structured representations relating to a plurality of sources, wherein a selective source pattern characterizes a selective implementation of a communication protocol by said source, and wherein said electronically analyzing comprises: electronically associating the new message with one of the plurality of distinct sources by comparing sets of structured representations of messages coming from different sources, and eliminating differences shared with sets of dynamic differences associated with said different sources to establish a set of static differences forming selective patterns.

11. The method according to claim 10, wherein said electronically searching for selective source patterns comprises:
    comparing structured representation of messages coming from the same source to derive a set of dynamic differences,
    repeating said comparing for at least one other source,
    comparing structured representation of messages coming from different sources, and
    eliminating differences shared with the sets of dynamic differences associated with said sources to derive a set of static differences forming the selective patterns.

12. The monitor according to claim 2, wherein said pattern associated respectively to a source is determined by comparing structured representations of messages emitted by different sources.

13. A monitor according to claim 1, wherein the discriminator comprises: a comparator capable of using a set of structured representations of messages coming from a same source, and determining the set of dynamic differences associated to said source by making comparisons between the structured representations of messages; and a deductor capable of comparing sets of structured representations of messages coming from different sources, and eliminating the differences shared with the sets of dynamic differences associated with said different sources determined by the comparator to establish said set of static differences forming selective patterns.

* * * * *